(12) United States Patent
Matsubara et al.

(10) Patent No.: US 11,211,889 B2
(45) Date of Patent: Dec. 28, 2021

(54) MOTOR SYSTEM

(71) Applicants: Toyota Jidosha Kabushiki Kaisha, Toyota (JP); Denso Corporation, Kariya (JP)

(72) Inventors: Kiyotaka Matsubara, Ichinomiya (JP); Makoto Nakamura, Okazaki (JP); Daigo Nobe, Toyota (JP); Ryuji Omata, Kariya (JP)

(73) Assignee: DENSO CORPORATION, Kariya (JP)

( * ) Notice: Subject to any disclaimer, the term of this patent is extended or adjusted under 35 U.S.C. 154(b) by 121 days.

(21) Appl. No.: 16/360,463

(22) Filed: Mar. 21, 2019

(65) Prior Publication Data

US 2019/0296676 A1 Sep. 26, 2019

(30) Foreign Application Priority Data

Mar. 22, 2018 (JP) .............................. JP2018-055320

(51) Int. Cl.
| | |
|---|---|
| *H02P 27/06* | (2006.01) |
| *H02P 21/22* | (2016.01) |
| *H02P 11/00* | (2006.01) |
| *H02M 7/44* | (2006.01) |
| *B60L 5/02* | (2006.01) |
| *B60L 15/02* | (2006.01) |

(Continued)

(52) U.S. Cl.
CPC ............ *H02P 27/06* (2013.01); *B60L 15/025* (2013.01); *H02M 7/44* (2013.01); *H02P 6/12* (2013.01); *H02P 11/00* (2013.01); *H02P 21/22* (2016.02); *H02P 2006/045* (2013.01)

(58) Field of Classification Search
USPC .................................. 318/800, 801, 400.02
See application file for complete search history.

(56) References Cited

U.S. PATENT DOCUMENTS

| 2005/0253395 A1 | 11/2005 | Blumel | |
|---|---|---|---|
| 2006/0164028 A1* | 7/2006 | Welchko | ............... B60L 15/025 318/105 |

(Continued)

FOREIGN PATENT DOCUMENTS

| JP | 2000125411 A | 4/2000 |
|---|---|---|
| JP | 2000324871 A | 11/2000 |

(Continued)

*Primary Examiner* — Jorge L Carrasquillo
(74) *Attorney, Agent, or Firm* — Dinsmore & Shohl LLP (57) ABSTRACT

A control unit distributes a motor voltage vector corresponding to an output request for a motor to a first and a second inverter voltage vectors associated with outputs from a first inverter and a second inverter, and determines whether a switching condition for three-phase-on mode is satisfied. Determining that the switching condition is satisfied, the control unit switches to three-phase-on mode in which every high-side switching element or every low-side switching element of one inverter is turned on and one end of a coil in each phase of the motor is brought into common connection, and the control unit drives the motor with an output from the other inverter. Herein, the switching condition for three-phase-on mode includes failure of one inverter and an inverter voltage vector of an output from one inverter being approximate to 0 when neither of the inverters fails.

5 Claims, 11 Drawing Sheets

(51) Int. Cl.
*H02P 6/12* (2006.01)
*H02P 6/04* (2016.01)

(56) References Cited

U.S. PATENT DOCUMENTS

| | | | |
|---|---|---|---|
| 2009/0033252 A1* | 2/2009 | Smith | H02J 1/102 |
| | | | 318/139 |
| 2010/0141189 A1* | 6/2010 | Matt | H02P 27/06 |
| | | | 318/400.26 |
| 2014/0097776 A1* | 4/2014 | Hayashi | B62D 5/0484 |
| | | | 318/400.21 |
| 2019/0097522 A1* | 3/2019 | Wada | H02M 7/53871 |
| 2020/0021205 A1* | 1/2020 | Nabeshi | H02M 7/493 |
| 2020/0186074 A1* | 6/2020 | Ghaderi | H02M 7/5387 |
| 2020/0247464 A1* | 8/2020 | Koikegami | G01R 31/3275 |
| 2020/0274461 A1* | 8/2020 | Koikegami | B60R 16/02 |

FOREIGN PATENT DOCUMENTS

| | | | |
|---|---|---|---|
| JP | 2005535276 A | 11/2005 | |
| JP | 2006238686 A | 9/2006 | |
| JP | 2008-219956 A | 9/2008 | |
| JP | 2016-181948 A | 10/2016 | |

\* cited by examiner

MOTOR SYSTEM

CROSS REFERENCE TO RELATED APPLICATION

This application claims priority to Japanese Patent Application No. 2018-055320 filed on Mar. 22, 2018, which is incorporated herein by reference in its entirety including the specification, claims, drawings, and abstract.

TECHNICAL FIELD

The present disclosure relates to a motor system including two power supplies and two inverters. In the motor system, one motor is driven by outputs from the two inverters.

BACKGROUND ART

JP 2006-238686 A discloses a motor system including two energy sources and two inverters. In this motor system, one motor is driven by outputs from the two inverters. In this system, when the motor is driven with power from one energy source, every switching element on the high side, or the low side in the inverter corresponding to the other energy source is turned on to form an artificial Y-shaped connection (star connection).

Similarly to JP 2006-238686 A, JP 2005-535276 A describes how to connect a motor in star by turning on or off switching elements of one inverter.

JP 2006-238686 A and JP 2005-535276 A describe that when one inverter is used in a system provided with two inverters, a motor is star-connected by the other inverter. However, neither JP 2006-238686 A nor JP 2005-535276 A describes what conditions cause star connection.

SUMMARY

A motor system according to the present disclosure includes: a first inverter provided with a plurality of arms, each arm including a high-side switching element and a low-side switching element connected in series and having both ends to which direct current power from a first power supply is supplied and having an intermediate point from which alternating current power is output; a second inverter provided with a plurality of arms, each arm including a high-side switching element and a low-side switching element connected in series and having both ends to which direct current power from second power supply is supplied and having an intermediate point from which alternating current power is output; a motor which is driven by the alternating current power from the first inverter and the alternating current power from the second inverter; and a control unit which controls the first inverter and the second inverter, wherein the control unit distributes a motor voltage vector corresponding to an output request for the motor to a first inverter voltage vector associated with an output from the first inverter and a second inverter voltage vector associated with an output from the second inverter and determines whether a switching condition for three-phase-on mode is satisfied, and when the control unit determines that the switching condition is satisfied, the control unit switches to three-phase-on mode in which every high-side switching element or every low-side switching element of one inverter is turned on and one end of a coil in each phase of the motor is brought into common connection, and the control unit drives the motor with an output from the other inverter, wherein the switching condition for three-phase-on mode includes failure of one inverter and an inverter voltage vector of an output from one inverter being approximate to 0 when neither of the inverters fails.

In a situation where one switching element of the one inverter is short-circuited, when the short-circuited switching element is a high-side switching element, the control unit may turns on every high-side switching element, or when the short-circuited switching element is a low-side switching element, the control unit may turns on every low-side switching element.

Even in a situation where neither of the two inverters fails and an inverter voltage vector of an output from one of the inverters is approximate to 0, when a change in the motor voltage vector is equal, to a predetermined value or more, the control unit may prohibits switching to three-phase-on mode.

According to the present disclosure, it is possible to perform three-phase-on in appropriate situations such that one inverter fails or two inverter does not fail but an output from one inverter has an inverter voltage vector approximate to 0.

BRIEF DESCRIPTION OF DRAWINGS

Embodiment(s) of the present disclosure will be described by reference to the following figures, wherein:

FIG. 12 is a flowchart of an operation for performing three-phase-on.

DESCRIPTION OF EMBODIMENTS

Hereinafter, an embodiment of the present disclosure will be described with reference to the drawings. It should be noted that the present disclosure is not limited to the embodiment described herein.

"Arrangement of System"

Figure 1:
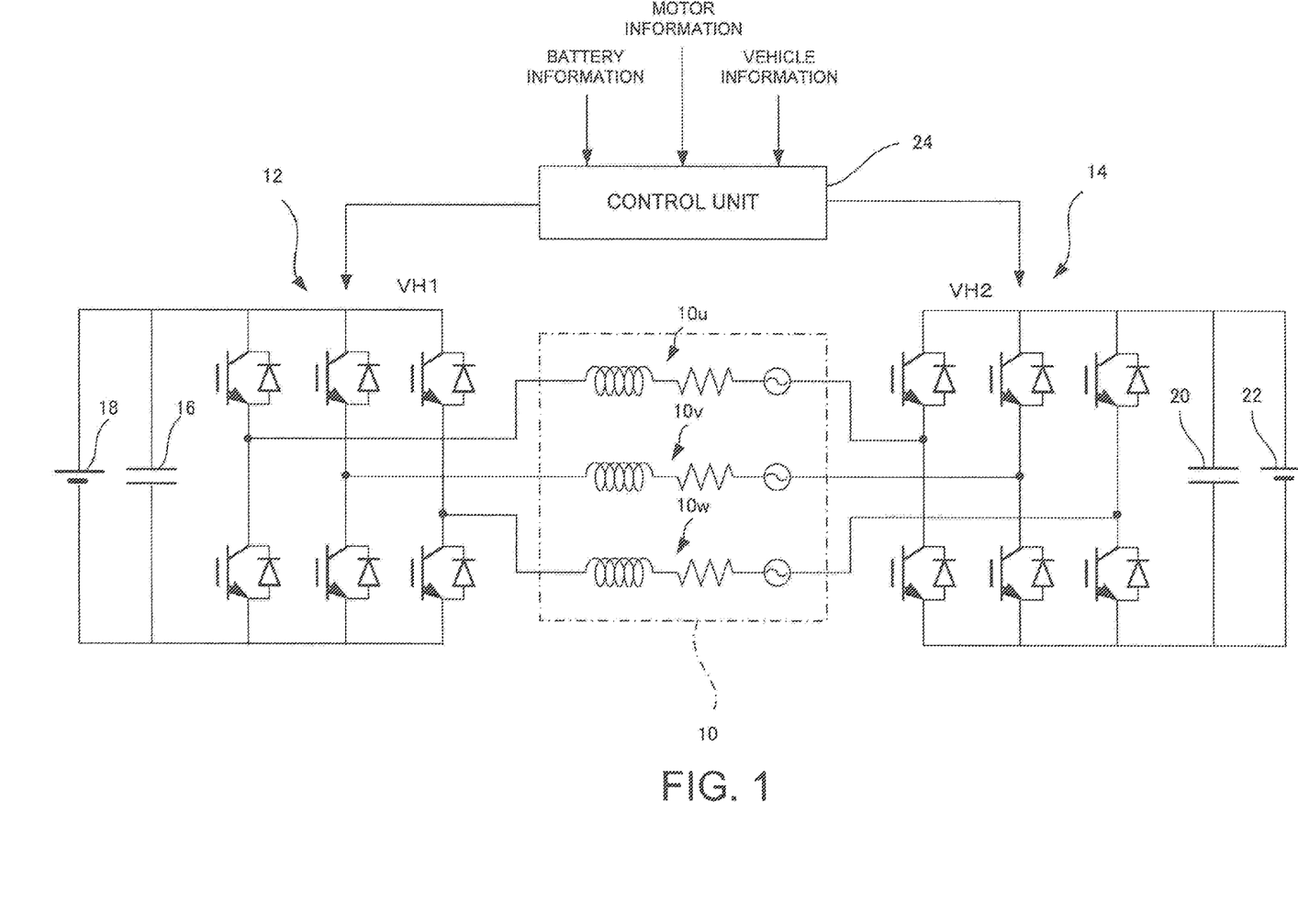
FIG. 1 illustrates a general arrangement of a motor system according to an embodiment.

FIG. 1 illustrates an arrangement of a motor system according to an embodiment. A motor 10 is a three-phase motor, including three-phase coils 10u, 10v, and 10w. Each of the coils 10u, 10v, and 10w includes a reactor component, a resistance component, and an induced electromotive force (back electromotive force) component, and those components are illustrated in the drawing as being connected to the coil in series. The system is assumed to be mounted on a vehicle, and the motor 10 is assumed to be a motor that generates a driving force for running the vehicle.

Each of the three-phase coils 10u, 10v, and 10w has one end connected to a first inverter 12 that converts direct current power to alternating current power, and each of the three-phase coils 10u, 10v, and 10w has the other end connected to a second inverter 14. In addition, to the first inverter 12, a first capacitor 16 and a first battery 18 are connected in parallel, and to the second inverter 14, a second capacitor 20 and a second battery 22 are connected in parallel. In this example, the first battery 18 and the second battery 22 are employed as a first power supply and a second power supply, but electric storage devices such as capacitors may also be employed.

The first inverter 12 and the second inverter 14 are arranged in a similar manner, including three (three-phase) arms, each of which includes two switching elements connected in series. Herein, an intermediate point of the arm in each phase is connected to a corresponding phase of the coils 10u, 10v, and 10w. Accordingly, at the time of powering, power from the first battery 18 is supplied to the motor 10 through the first inverter 12, and at the time of regeneration (power generation), power from the motor 10 is supplied to the first battery 18 through the first inverter 12. The second inverter 14 and the second battery 22 also exchange power with the motor 10 in a similar manner.

In each switching element, a transistor such as an IGBT (Insulated Gate Bipolar Transistor) and a backward diode are connected in parallel. When a high-side transistor is turned on, a current flows toward a corresponding phase coil, and when a low-side transistor is turned on, a current is withdrawn from a corresponding phase coil.

A control unit 24 produces switching signals for the first inverter 12 and the second inverter 14 based on battery information, motor information, vehicle information, and the like so as to control switching of those inverters.

"Arrangement of Control Unit"

Figure 2:
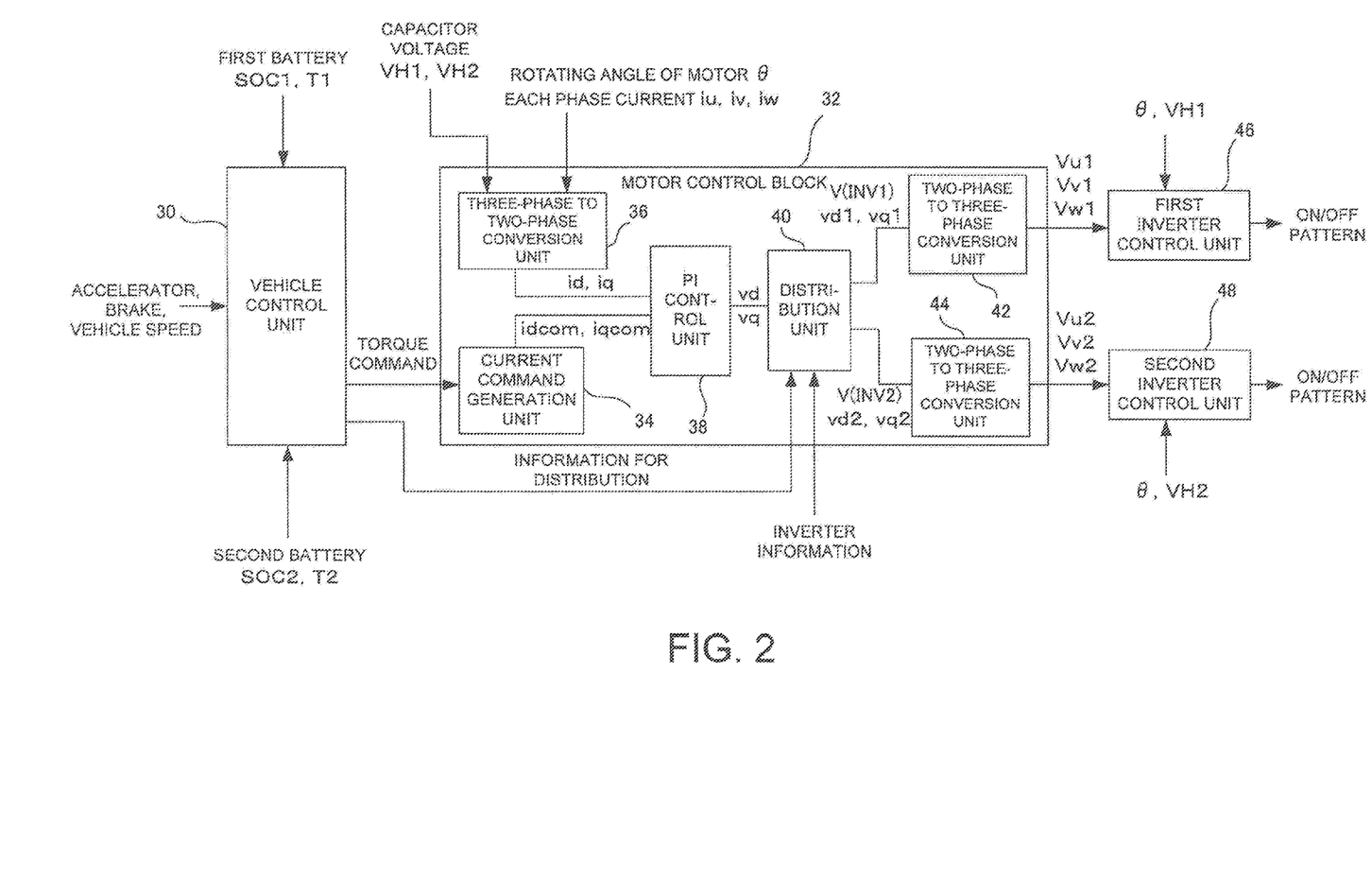
FIG. 2 is a diagram illustrating an arrangement of a control unit.

FIG. 2 illustrates an arrangement of the control unit 24. A vehicle control unit 30 receives information associated with a running vehicle, for example, control inputs of an accelerator pedal and a brake pedal and a vehicle speed, and receives battery information such as states of charge of the first battery 18 and the second battery 22 (SOC1 and SOC2) and temperatures of the first battery 18 and the second battery 22 (T1 and T2). Navigation information such as road conditions and destinations may be also be supplied to the vehicle control unit 30.

The vehicle control unit 30 calculates a torque command in regard to an output request (target output torque) for the motor 10 based on, for example, the control inputs of the accelerator pedal and the brake pedal.

The calculated torque command is supplied to a current command generation unit 34 of a motor control block 32. Based on the torque command, the current command generation unit 34 calculates a d-axis current idcom and a q-axis current iqcom which are target current commands in vector control of the motor 10. A capacitor voltage VH1 of the first capacitor 16 and a capacitor voltage VH2 of the second capacitor 20, a rotor rotating angle θ of the motor 10, and each of phase currents iu, iv, and iw at the moment are supplied to a three-phase to two-phase conversion unit 36. The three-phase to two-phase conversion unit 36 converts each of the detected phase currents in, iv, and iw into a d-axis current id and a q-axis current iq. The target current commands (d-axis and q-axis currents) idcom and iqcom from the current command generation unit 34 and the d-axis current id and the q-axis current iq front the three-phase to two-phase conversion unit 36 are supplied to a PI control unit 38, and a motor voltage vector V (d-axis excitation voltage command vd and q-axis torque voltage command vq) is calculated. The PI control unit 38 calculates a voltage command (motor voltage vector V (vd and vq)) by feedback control such as P (proportional) control and I (integral) control. Note that the feedback control may be carried out in combination with feedforward control such as predictive control.

The calculated motor voltage vector V (voltage commands vd and vq) is supplied to a distribution unit 40. The distribution unit 40 distributes the motor voltage vector V (voltage commands vd and vq) to a first inverter voltage vector V (INV1) (voltage commands vd1 and vq1) for the first inverter 12 and to a second inverter voltage vector V (INV2) (voltage commands vd2 and vq2) for the second inverter 14. The distribution performed by the distribution unit 40 will be described later.

The voltage commands vd1 and vq1 from the distribution unit 40 are supplied to a two-phase to three-phase conversion unit 42 in which those commands are converted into three-phase voltage commands Vu1, Vv1, and Vw1 for the first inverter 12 and from which those commands are output. The voltage commands vd2 and vq2 are supplied to a two-phase to three-phase conversion unit 44 in which those commands are converted into three-phase voltage commands Vu2, Vv2, and Vw2 for the second inverter 14 and from which those commands are output. Note that the current command generation unit 34, the three-phase to two-phase conversion unit 36, the PI control unit 38, the distribution unit 40, and the two-phase to three-phase conversion units 42 and 44 are included in the motor control block 32.

The three-phase voltage commands Vu1, Vv1, and Vw1 for the first inverter 12 from the two-phase to three-phase conversion unit 42 are supplied to a first inverter control unit 46, and the three-phase voltage commands Vu2, Vv2, and Vw2 for the second inverter 14 are supplied to a second inverter control unit 48. The first inverter control unit 46 receives the rotor rotating angle θ and the first inverter input voltage VH1 and produces switching signals for turning on or off the switching elements of the first inverter 12 based on a comparison of a PWM carrier (for example, triangular wave) with the voltage commands Vu1, Vv1, and Vw1. The first inverter control unit 46 then supplies the switching signals to the first inverter 12. Similarly, the second inverter control unit 48 produces switching signals for turning on or off the switching elements in the second inverter 14 and supplies the switching signals to the second inverter 14.

In this manner, the switching of the first inverter 12 and the second inverter 14 is controlled by the signals from the control unit 24. Accordingly, outputs from the first inverter 12 and the second inverter 14 are added up, causing a flow of a desired current to the motor 10.

"Switching Waveform"

Figure 3A:
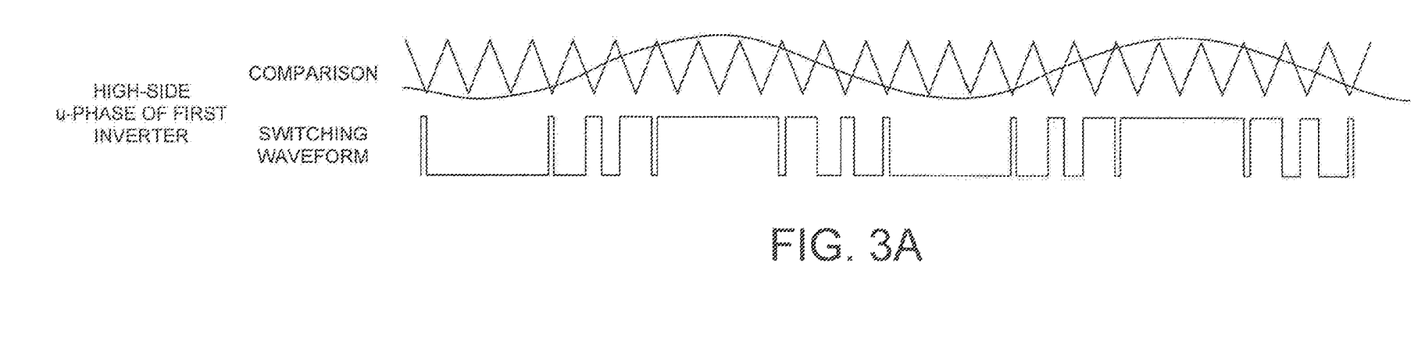
FIG. 3A is a diagram illustrating a switching waveform (at a 50:50 distribution ratio) of a high-side switching element of a first inverter.
Figure 3B:
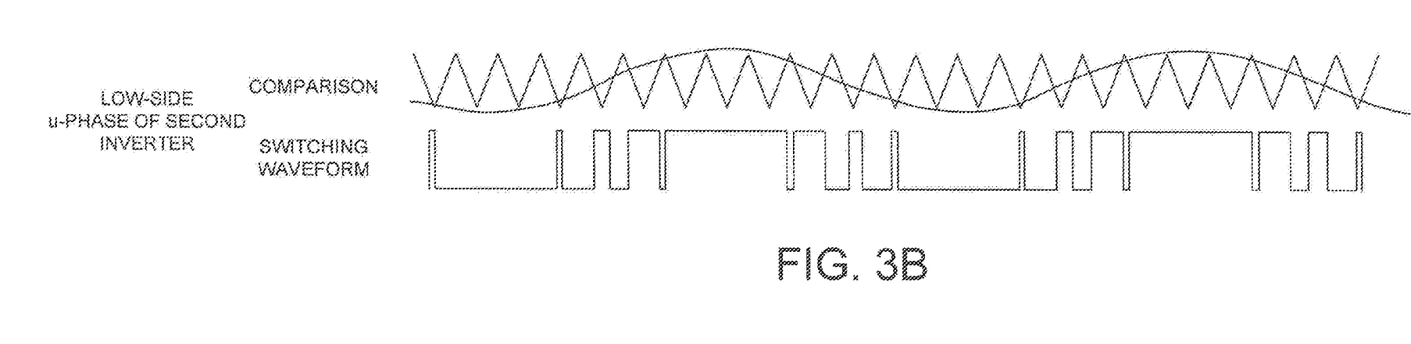
FIG. 3B is a diagram illustrating a switching waveform (at a 50:50 distribution ratio) of a low-side switching element of a second inverter.

FIGS. 3A and 3B illustrates the production of switching signals in the first inverter control unit 46 and the second inverter control unit 48. In the example illustrated in FIG. 3A, the upper part of the diagram illustrates a comparison of the triangular wave with the voltage command Vu1 for a high-side u-phase switching element of the first inverter 12, and the lower part of the diagram illustrates a switching waveform obtained by the comparison result. FIG. 3B relates to a low-side u-phase switching element of the second inverter 14, and a waveform illustrated in FIG. 3B is equal to that in FIG. 3A. Due to such a switching operation, a current flows from the high-side u-phase switching element of the first inverter 12 to the low-side u-phase switching element of the second inverter 14 through the u-phase coil 10$u$ of the motor 10. Switching waveforms of a low-side u-phase switching element of the first inverter 12 and a high-side u-phase switching element of the second inverter 14 are basically the inversion of the waveforms illustrated in FIGS. 3A and 3B. The switching operations for the first inverter 12 and the second inverter 14 are controlled in such a manner that currents having phases different from each other by 120 degrees flow through the u-phase coil 10$u$, the v-phase coil 10$v$, and the w-phase coil 10$w$ of the motor 10. In this example, there is a period in which a voltage command continuously exceeds the triangular wave, and this period causes overmodulation PWM control.

"Motor Voltage and Current"

Figure 4A:
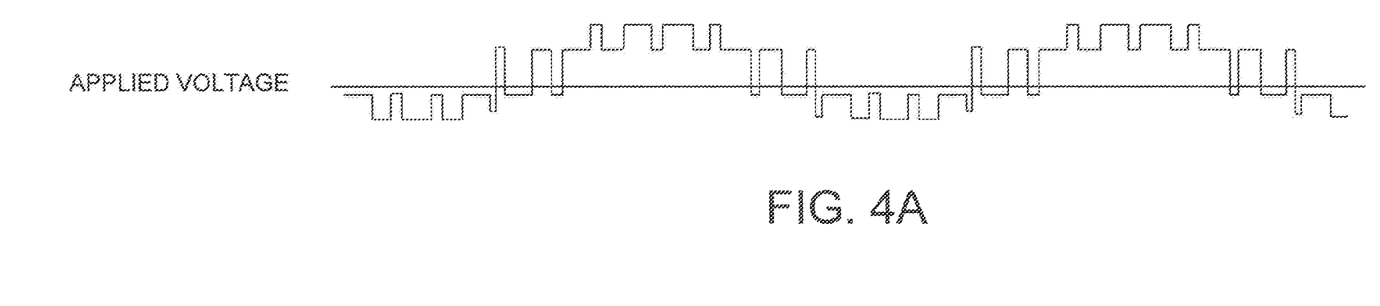
FIG. 4A is a diagram illustrating an applied voltage with respect to one phase of a motor and a waveform of a corresponding current.
Figure 4B:
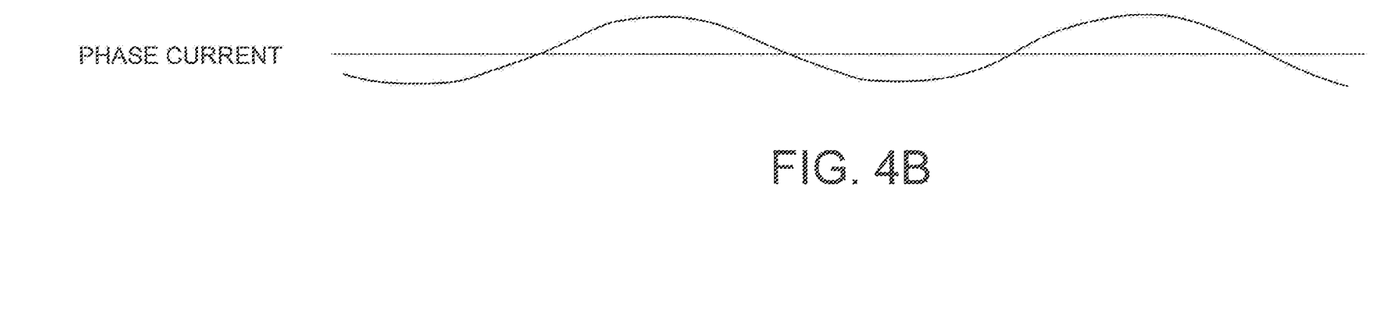
FIG. 4B is a diagram illustrating an applied voltage with respect to one phase of the motor and a waveform of a corresponding current.

FIG. 4A illustrates an applied voltage with respect to one phase (one phase coil) of the motor 10, and FIG. 4B illustrates a motor current (phase current). A voltage applied to each phase of the motor 10 is formed from an induced voltage (back electromotive voltage) generated by the motor 10, and output voltages of the first inverter 12 and the second inverter 14 (voltages output by turning on or off the switching elements). In other words, the switching elements of the first inverter 12 and the second inverter 14 are turned on or off by switching signals as illustrated in FIGS. 3A and 3B, and a voltage in one direction for a current flowing from the first inverter 12 to the second inverter 14 is applied to one phase of the motor 10. Since a phase current depends on a voltage to be applied, application of a voltage (phase voltage) as illustrated in FIG. 4A causes a phase current as illustrated in FIG. 4B to flow in one phase of the motor 10.

The shape and ripples of a phase current depend on a voltage to be applied. For example, a PWM controlled carrier (triangular wave) at a low frequency causes large ripples.

"Distribution of Outputs in Two Inverters"

The distribution unit 40 in FIG. 2 distributes the motor voltage vector V to the first and the second inverter voltage vectors V (INV1) and V (INV2) at any ratio based on, for example, various kinds of information (information for distribution) supplied from the vehicle control unit 30 which is a higher-order control unit and based on inverter information that indicates operating states of the first inverter 12 and the second inverter 14. While a motor voltage vector is maintained, the motor voltage vector, is distributed to two inverter voltage vectors. Accordingly, this distribution at any ratio involves changes of the motor voltage vector in magnitude, phase, and positive/negative directions.

<Changes in Distribution Ratio of Output>

Figure 5A:
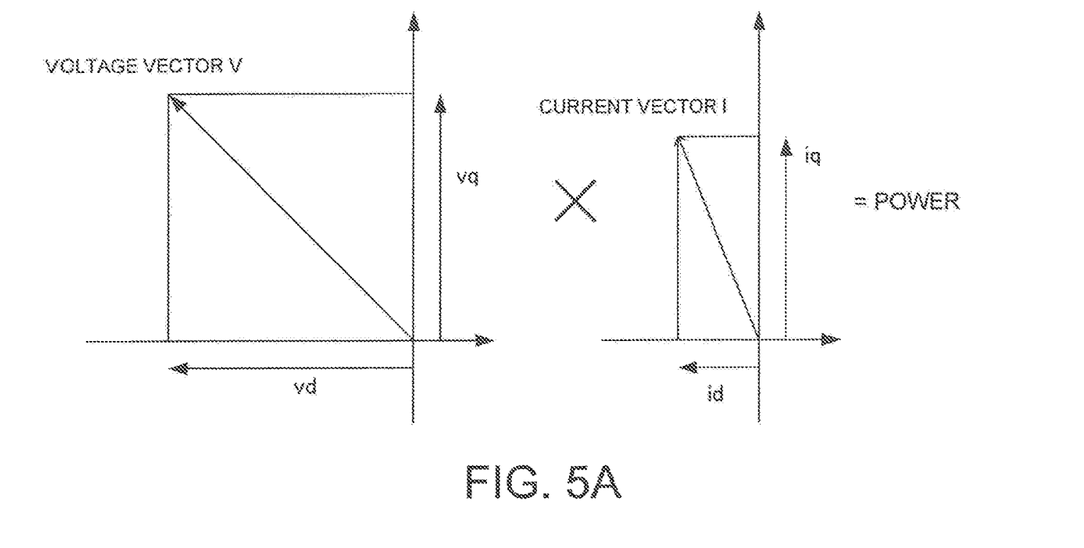
FIG. 5A illustrates distribution of a voltage vector in a case of using one inverter.

FIG. 5A illustrates vector control of a voltage and a current, using one inverter in normal motor drive. The motor voltage vector V (d-axis voltage vd and q-axis voltage vq) and a motor current vector I (d-axis current id and q-axis current iq) are determined according to an output request for the motor 10. The motor voltage×the motor current produces an output (power).

Figure 5B:
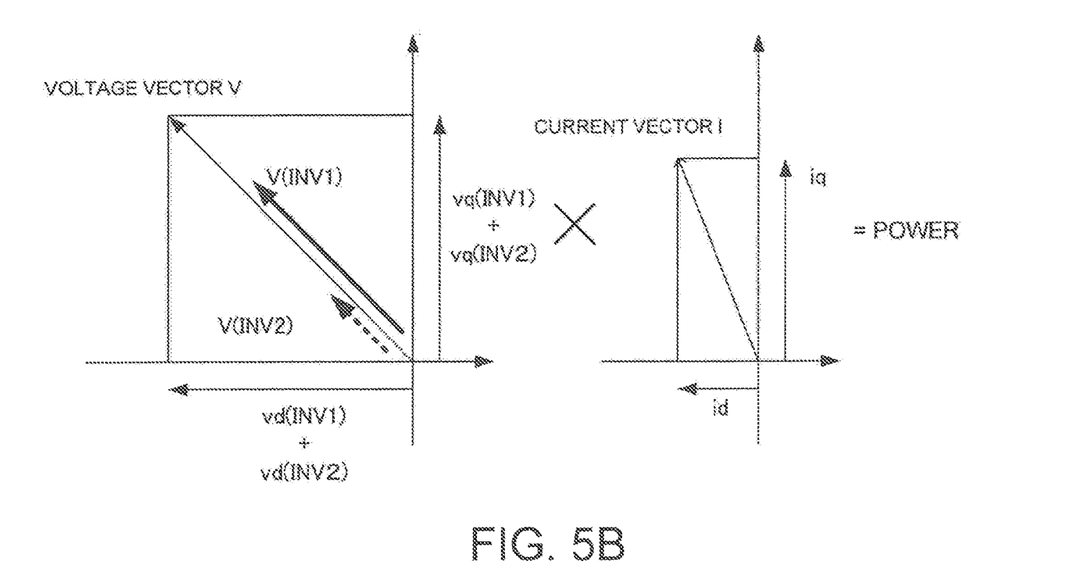
FIG. 5B illustrates distribution of a voltage vector in a case where two inverters have voltage vectors of different magnitude.

The motor system in this embodiment includes two inverters, the first inverter 12 and the second inverter 14. Herein, outputs from the two inverters may be made unequal. In FIG. 5B, the voltage vector V (INV1) of an output from the first inverter 12 (first inverter voltage vector) and the voltage vector V (INV2) of an output from the second inverter 14 (second inverter voltage vector) are changed in magnitude but not in phase. This case does not vary the output (power) from the motor 10 but varies the shape (waveform) of the switching signals in the first inverter 12 and the second inverter 14. Provided that d-axis components of the outputs from the first inverter 12 and the second inverter 14 are vd (INV 1) and vd (INV 2), the d-axis components vd=vd (INV 1)+vd (INV 2), and the q-axis components vq=vq (INV1)+vq (INV2).

Figure 6A:
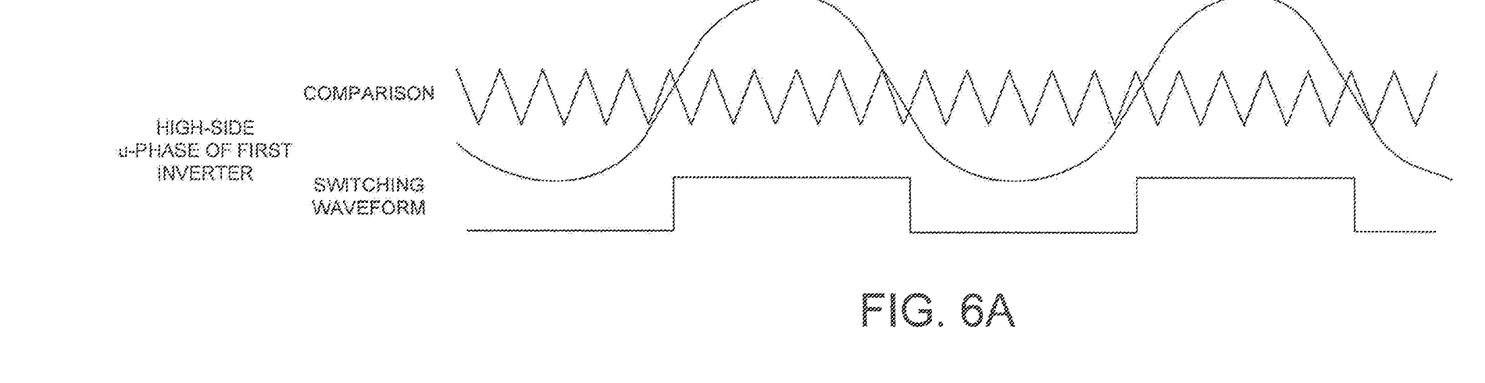
FIG. 6A is a diagram illustrating a switching waveform (at a 60:40 distribution ratio) of the high-side switching element of the first inverter.
Figure 6B:
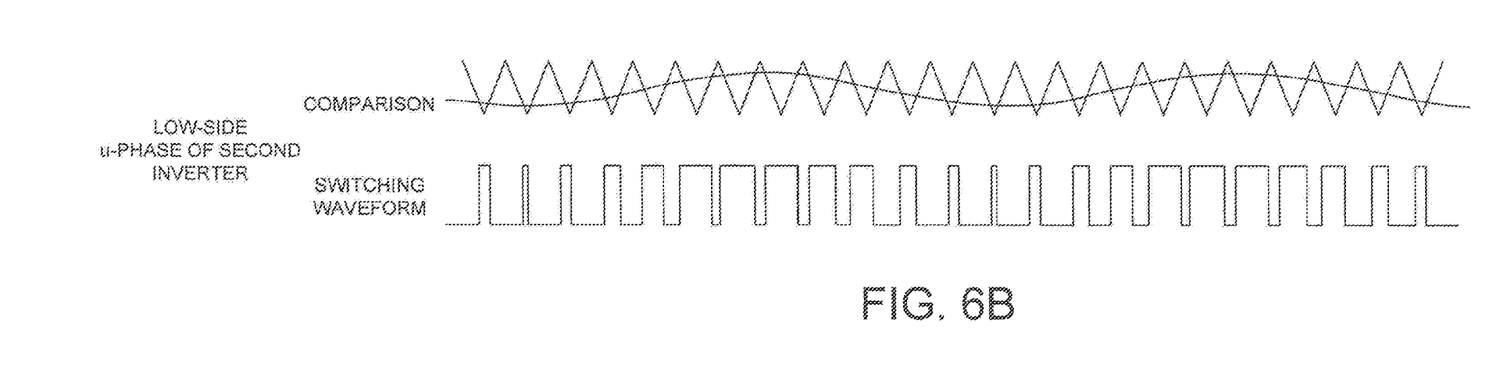
FIG. 6B is a diagram illustrating a switching waveform (at a 60:40 distribution ratio) of the low-side switching element of the second inverter.

FIGS. 6A and 6B illustrate a waveform of the switching signals when the distribution ratio of power is 60:40 in FIG. 5B. FIG. 6A shows 60%, and FIG. 6B shows 40%. In this example, the voltage command is large, causing square wave control in FIG. 6A. In FIG. 6B, the number of switching operations is larger.

Changing a distribution ratio while maintaining the phases of the voltage vectors V (INV1) and V (INV2), or two inverter outputs, as illustrated in FIG. 5B varies the waveform of the switching signals as illustrated in FIGS. 6A and 6B. This leads to variations in shape of a phase voltage with respect to the motor 10, causing an increase or a decrease in number of switching operations and variations in pulse width.

Furthermore, the outputs and losses in the first inverter 12 and the second inverter 14 vary, and heat generated in the first inverter 12 and the second inverter 14 also vary. Moreover, the variations in shape of the phase voltage lead to variations in shape of the phase current, causing variations in sound to be generated as well as in battery current.

In this manner, as the motor voltage vector V is distributed to the voltage vector V (INV1) of the first inverter 12 and the voltage vector V (INV2) of the second inverter 14 at any ratio, it is possible to meet requirements for the system.

<Changes in Magnitude of Voltage Vector>

Figure 7A:
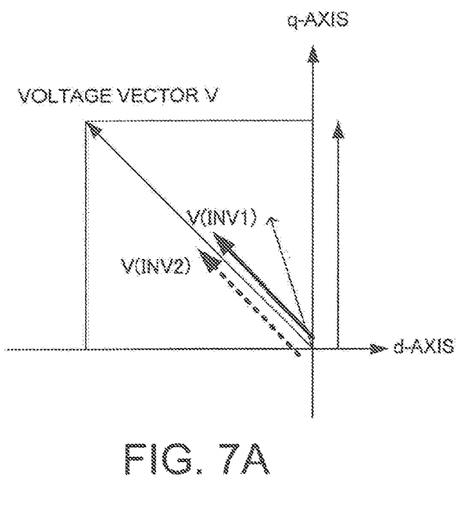
FIG. 7A a diagram illustrating distribution of voltage vectors at equivalent distribution ratios in powering mode.
Figure 7B:
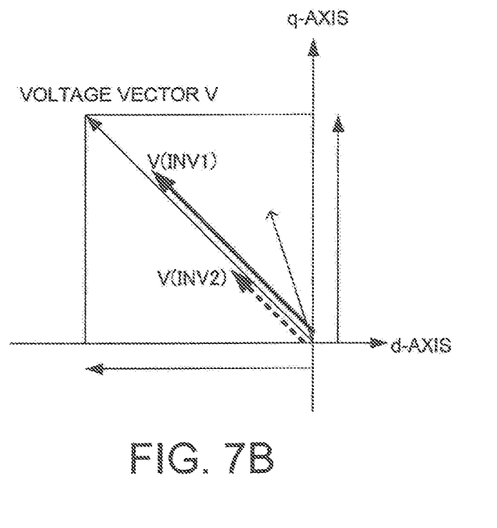
FIG. 7B a diagram illustrating distribution of voltage vectors at different distribution ratios in powering mode.

FIGS. 7A and 7B illustrate a case where, in powering mode (state of energy consumption), the voltage vector V (INV1) of the first inverter 12 and the voltage vector V (INV2) of the second inverter 14 are changed in magnitude but maintained in phase. In FIG. 7A, the magnitude of the voltage vector V (INV1) of the first inverter 12 and the magnitude of the voltage vector V (INV2) of the second inverter 14 are made equal and are distributed equally. However, in FIG. 7B, the voltage vector V (INV1) of the first inverter 12 is large and the voltage vector V (INV2) of the second inverter 14 is small. Accordingly, a load on the first inverter 12 is large, and a load on the second inverter 14 is small. As described above, the switching waveform and the like are also different between those two inverters.

Figure 7C:
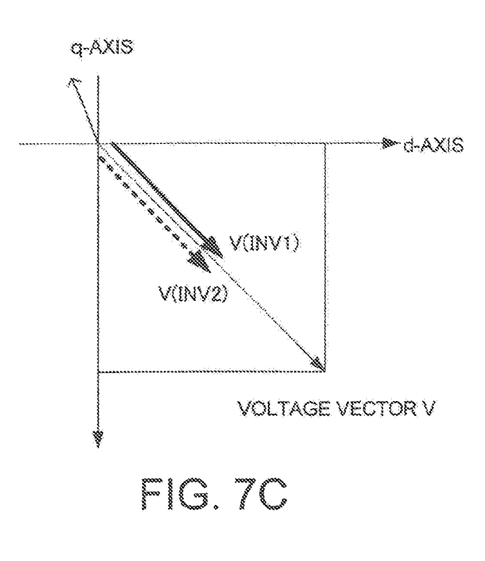
FIG. 7C a diagram illustrating distribution of voltage vectors at equivalent distribution ratios in regeneration mode.
Figure 7D:
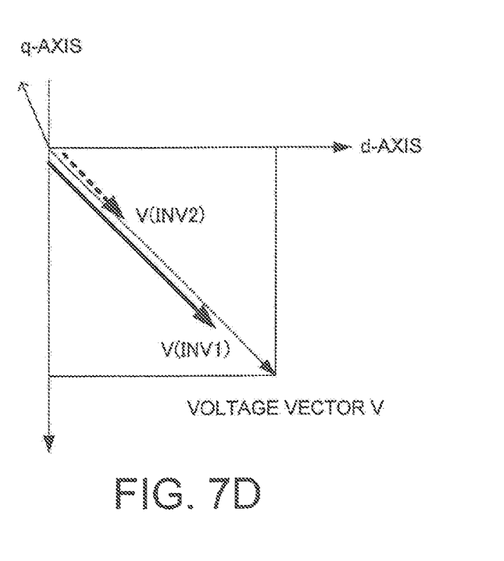
FIG. 7D a diagram illustrating distribution of voltage vectors at different distribution ratios in regeneration mode.

FIGS. 7C and 7D illustrate a case where, in regeneration mode (state of energy recovery), the voltage vector V (INV1) of the first inverter 12 and the voltage vector V (INV2) of the second inverter 14 are changed in magnitude but maintained in phase. In FIG. 7C, the magnitude of the voltage vector V (INV1) of the first inverter 12 and the magnitude of the voltage vector V (INV2) of the second inverter 14 are made equal. However, in FIG. 7D, the voltage vector V (INV1) of the first inverter 12 is large and the voltage vector V (INV2) of the second inverter 14 is small. Accordingly, a load on the first inverter 12 is large, and a load on the second inverter 14 is small. As described above, the switching waveform and the like are different between those two inverters.

In FIGS. 7A to 7D and other drawings, when the vectors overlap each other, those vectors are appropriately shifted to facilitate visualization.

<Change in Positive/Negative Direction (Sign) of Voltage Vector>

It is also possible to change a positive or a negative direction of either the voltage vector V (INV1) of the first inverter 12 or the voltage vector V (INV2) of the second inverter 14 without changing the motor voltage vector V.

Figure 8:
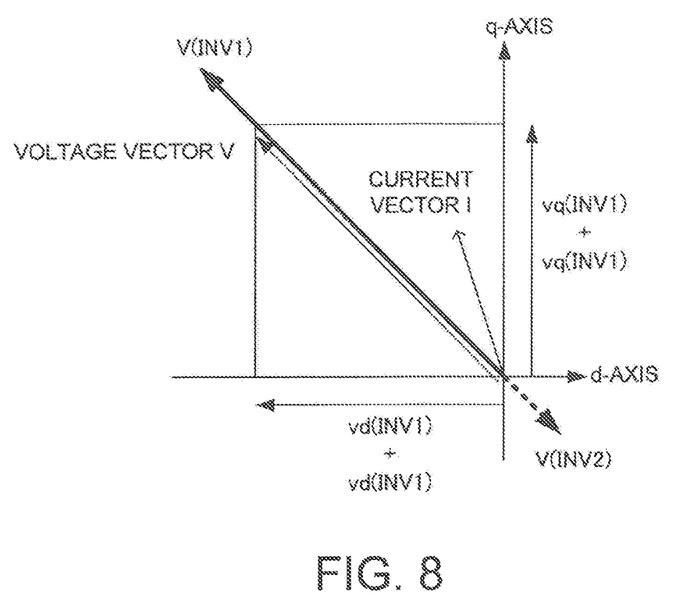
FIG. 8 is a diagram for describing distribution of voltage vectors in a case where one voltage vector is oriented to the regeneration side in powering mode.

In FIG. 8, the voltage vector V (INV1) of the first inverter 12 is increased with respect to the motor voltage vector V by a predetermined amount, and the voltage vector V (INV2) the second inverter 14 is oriented to the regeneration side in equal amount. Accordingly, one of two inverters is in a state of energy consumption, while the other is in a state of energy flow. In this example, the second inverter 14 generates power to charge the second battery 22 without changing the motor voltage vector V (the powering mode).

Figure 9:
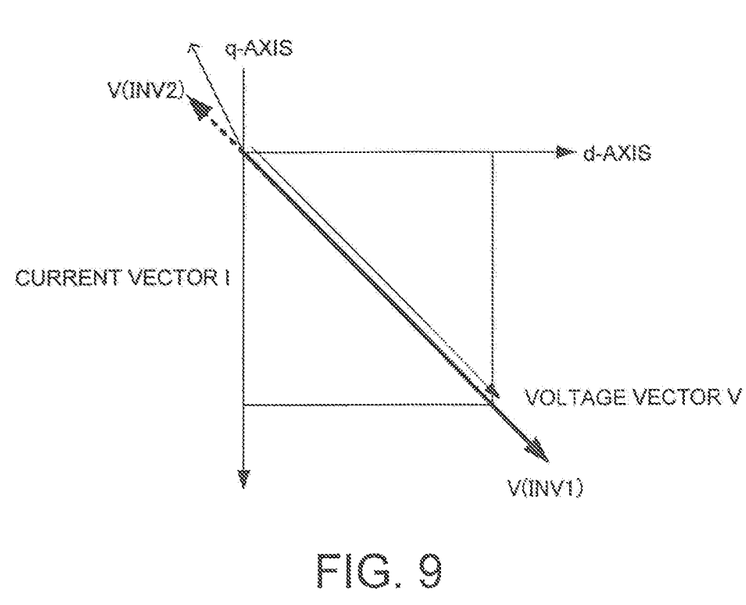
FIG. 9 is a diagram for describing distribution of voltage vectors in a case where one voltage vector is oriented to the powering side in regeneration mode.

In FIG. 9, in regeneration mode, the voltage vector V (INV1) of the first inverter 12 is increased with respect to the motor voltage vector V by a predetermined amount in the regeneration side, and the voltage vector V (INV2) of the second inverter 14 is oriented to the powering side in equal amount. Accordingly, the second inverter 14 consumes energy in powering mode without changing the motor voltage vector V (regeneration mode).

<Changes in Phase of Voltage Vector>

It is also possible to change the voltage vector V (INV1) of the first inverter 12 and the voltage vector V (INV2) of the second inverter 14 in phase. A change in phase changes a power factor in outputs from two inverters.

Figure 10A:
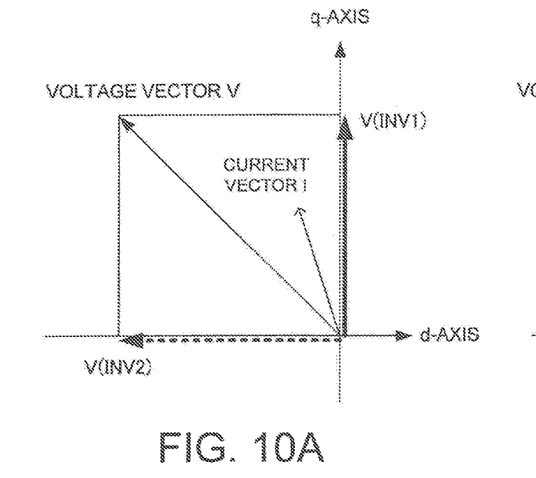
FIG. 10A is a diagram illustrating distribution of voltage vectors of two inverters when an output of one inverter is an excitation component (d-axis) and an output of the other inverter is a torque component (q-axis)

In FIG. 10A, while maintaining the motor voltage vector V and the motor current vector I, the voltage vector V (INV1) of the first inverter 12 is set to a q-axis voltage and the voltage vector V (INV2) of the second inverter 14 is set to a d-axis voltage to change the roles of the two inverters.

Figure 10B:
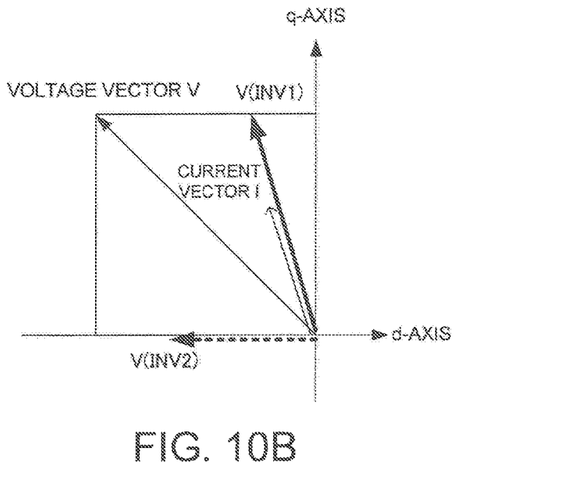
FIG. 10B is a diagram illustrating distribution of voltage vectors of two inverters when an output of one inverter is brought into line with a motor current vector in phase and an output of the other inverter is an excitation component.
Figure 10C:
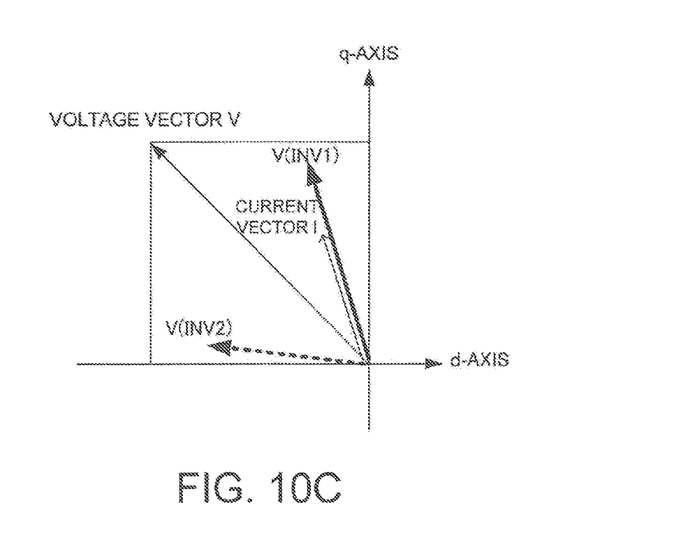
FIG. 10C is a diagram illustrating distribution of voltage vectors of two inverters when an output of one inverter is brought into line with the motor current vector in phase and an output of the other inverter is equivalent to the remaining excitation component and a torque component.

In FIGS. 10B and 10C, the phase of the voltage vector V (INV1) of the first inverter 12 is brought into line with the phase of the motor current vector I. The voltage vector V (INV2) of the second inverter 14 is taken as a difference between the motor voltage vector V. Accordingly, the phase of the voltage vector V (INV1) of the first inverter 12 is made equal to the phase of the motor current vector I, while maintaining the motor voltage vector V and the motor current vector I.

For example, when the first inverter 12 and the second inverter 14 have different efficiencies and when the first inverter 12 offers better efficiency, the phase of the voltage vector V (INV1) of the first inverter 12 is brought into line with the phase of the motor current vector I, as illustrated in FIGS. 10B and 10C, so as to improve a power factor of drive by the first inverter 12 and to enhance efficiency as a whole.

In this manner, a change in phase of voltage vectors from two inverters changes a power factor in outputs from the inverters, which changes a motor voltage vector in magnitude and changes power.

"Three-Phase-On Mode"

In a case of driving as illustrated in FIGS. 7B and 7D, an output from one inverter (for example, the second inverter 14) is decreased to reduce a load. In such a case, the voltage vector V (INV2) of the output from one inverter (for example, the second inverter 14) may be 0 (including approximations of 0, which indicates that the voltage vector V (INV2) is substantially 0).

Figure 11:
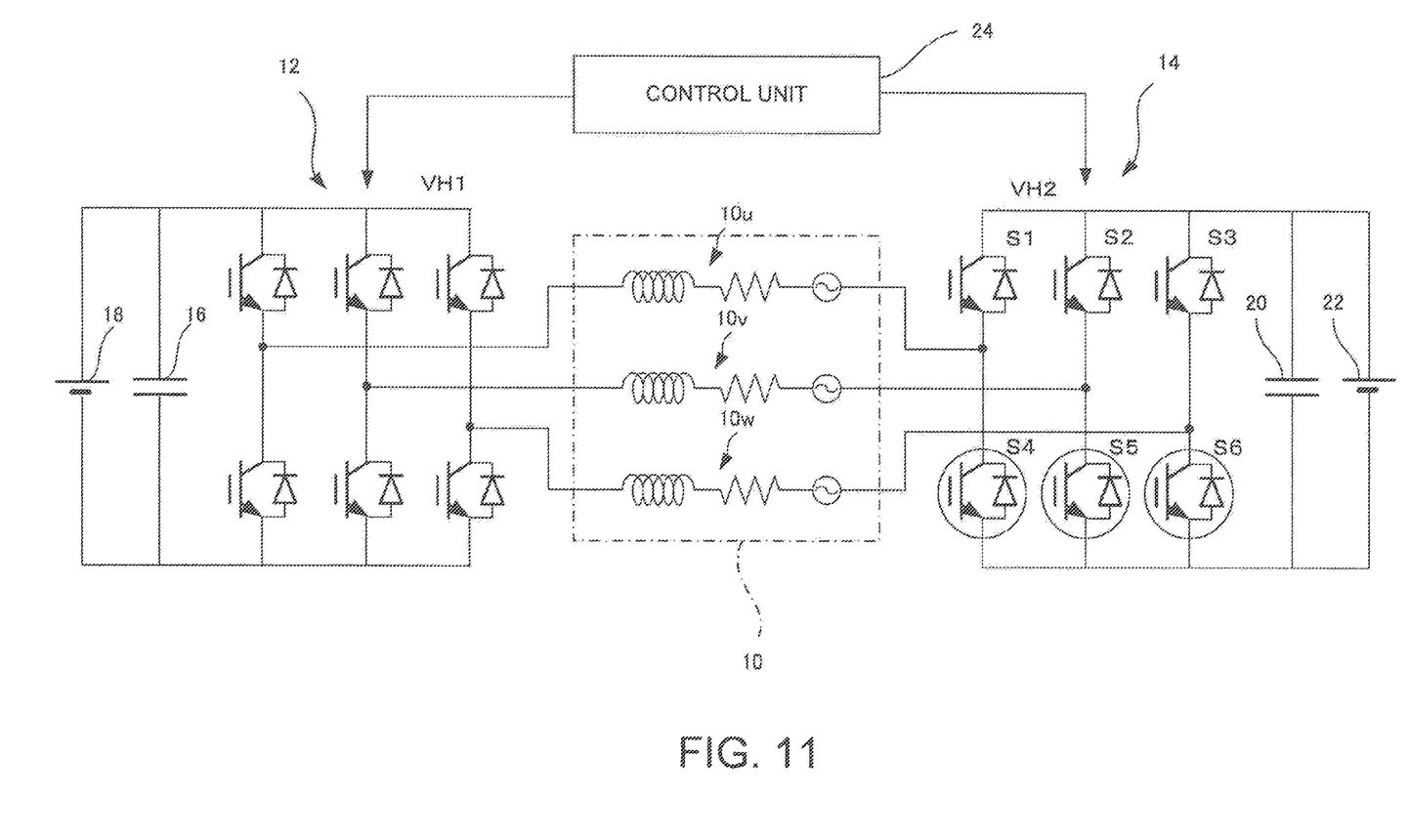
FIG. 11 is a diagram for describing three-phase-on mode in which three low-side switching elements of a second inverter are turned on in a motor system.

Such a state is illustrated in FIG. 11, for example. In this example, three high-side switching elements of six switching elements in the second inverter 14 are referred to as switching elements S1, S2, and S3, and three low-side switching elements are referred to as switching elements S4, S5, and S6. For example, the switching elements S4, S5, and S6 are fixed to ON, while the switching elements S1, S2, and S3 are fixed to OFF. Accordingly, the three-phase coils 10$u$, 10$v$, and 10$w$ of the motor 10 are brought into common connection at one end through the switching elements S4, S5, and S6, causing star connection. This mode is referred to as three-phase-on. In three-phase-on mode, the motor 10 is driven by supplying power corresponding to an output request to the motor 10 by the first inverter 12. Note that the switching elements S1, S2, and S3 may be fixed to ON, and the switching elements S4, S5, and S6 may be fixed to OFF. The first inverter 12 and GND of the second inverter 14 may be separated from each other.

Figure 12:
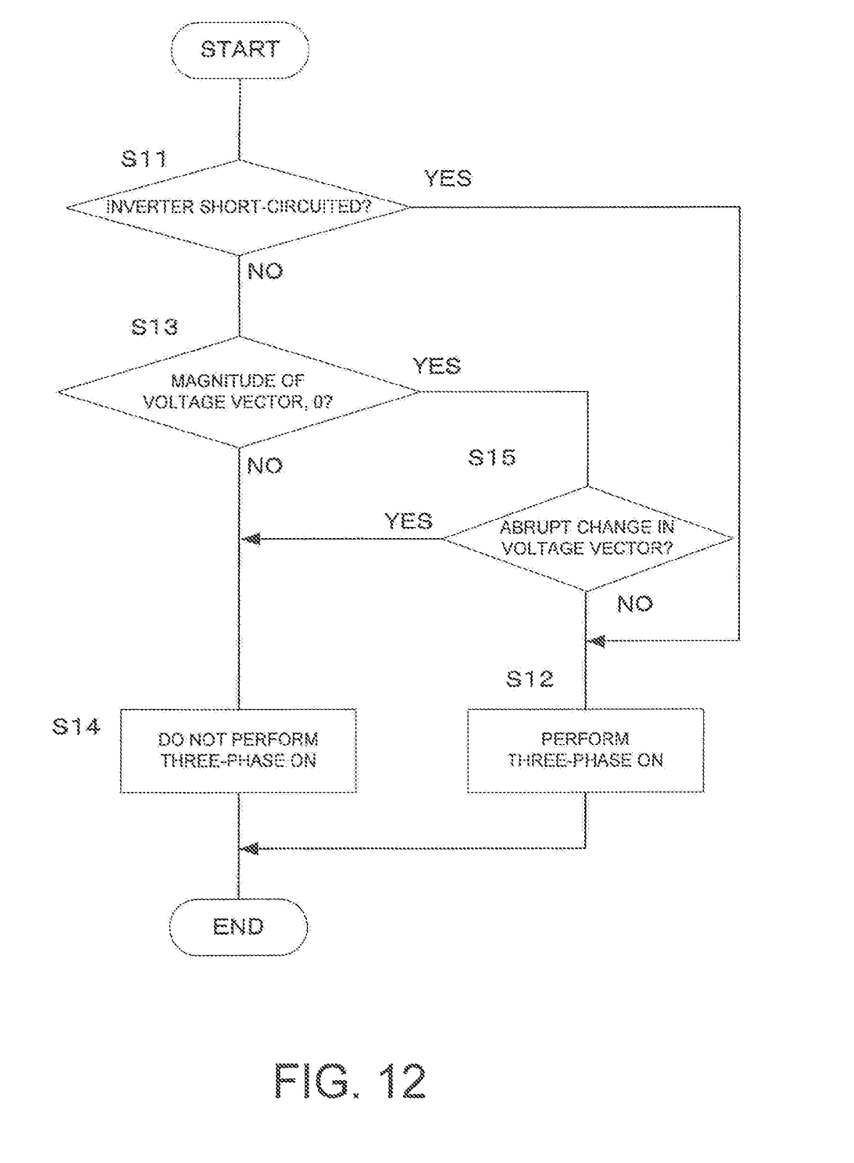

Whether to perform three-phase-on is determined by the control unit 24. The operation of this determination is illustrated in FIG. 12.

The first step is to determine whether one of the first inverter 12 and the second inverter 14 is short-circuited (S11). In the usual case, one switching element fails. Accordingly, provided herein that one switching element of the first inverter 12 and the second inverter 14 is to be short-circuited. If the result of the determination is YES, three-phase-on is performed (S12). When one switching element in an arm of an inverter is short-circuited in this manner, turning on the other switching element of the arm causes a short circuit in the arm and breaks various components. This makes the inverter inoperable. In this case, in this embodiment, the switching element on the same side (high or low side) as the short-circuited switching element is fixed to ON. For example, when one of the switching elements S4, S5, and S6 in FIG. 11 is short-circuited, the remaining two switching elements are fixed to ON and are put in three-phase-on mode. Furthermore, when one of the switching elements S1, S2, and S3 is short-circuited, the remaining two switching elements are fixed to ON.

In this manner, it is possible to drive the motor 10 by an output from an inverter with no failure, which establishes fail-safe.

If the result of the determination is NO in S11, the control unit 24 determines whether a voltage vector is 0 (S13). For example, if the second inverter 14 is a target of three-phase-on, the control unit 24 determines that the voltage vector V (INV2)=0 in the second inverter 14. As described above, in regard to the voltage vector V (INV1) of the output from the first inverter 12 and the voltage vector V (INV2) of the output from the second inverter 14, the voltage vector of one inverter output may be 0. In a case where the second inverter 14 is put in three-phase-on mode, a maximum value of the output from the first inverter 12 is larger than an output request for the motor 10, the maximum value of the first inverter 12 is determined based on such as the voltage of the first battery 18 and the ability of the first inverter. Putting the second inverter 14 in three-phase-on mode as described above leads to prevention of energy loss in switching of the switching elements in the second inverter 14. Accordingly, when the voltage vector V (INV2) of the second inverter 14 is equal to a predetermined value or less, the voltage vector V (INV2) may be set to 0. Furthermore, even though voltage vectors of two inverter outputs are in opposite directions, if one is very small, the voltage vector may be set to 0.

As described above, in this embodiment, two conditions; that is, a failure of a switching element and a voltage vector at 0 are regarded as switching conditions for three-phase-on mode.

If the result of the determination is NO in S13, three-phase-on is not performed (S14). If three-phase-on is performed when a voltage vector is not 0, an output from the motor 10 is changed by a change in the voltage vector. Therefore, when the voltage vector is not 0, switching to three-please-on mode is not performed.

If the result of the determination is YES in S13, the control unit 24 determines whether a voltage vector (for example, V (INV2)) of an inverter targeted for three-phase-on is changing abruptly (S15). This may be determined based on a magnitude of a differential of the voltage vector. The determination may be carried out based on variations in a certain amount of time (for example, several seconds). If the result of the determination is YES in step S15, the process proceeds to step S14, and three-phase-on is not performed. In other words, when there is a situation where the motor voltage vector is changing abruptly, a vehicle is considered to be in the following situations, for example, (i) slipping or gripping, (ii) running at a large rate of acceleration (large powering), or (iii) running in deceleration mode (large regeneration) using a brake.

Under these situations, a voltage command itself is changing, therefore the voltage vector should be changed in accordance with the change of the voltage command. A certain amount of time is required for switching between performing and not performing three-phase-on, and, as such, in some embodiments, a delay in controlling an output of the motor in accordance with the output request for the motor is to be avoided. Specifically, there are worries, for example, a change of the voltage vector when the three-phase-on starts becomes large, it causes vibration or shock to the vehicle. Accordingly, with an abrupt change in voltage vector, switching from the normal to the three-phase-on is prohibited so as to maintain controllability of drive according to an output request for a motor output.

In FIG. 12, both of the first inverter 12 and the second inverter 14 are described collectively. However, the process is facilitated when the first inverter 12 and the second inverter 14 individually perform determination.

"Other Arrangement"

A three-phase-on determination unit as described above may be disposed in the upper stream of the distribution unit 40 in FIG. 2. In this case, since the three-phase-on determination unit is disposed at a position before determination of a motor voltage vector, the three-phase-on determination unit is not able to determine an inverter voltage vector. Accordingly, the three-phase-on determination unit may determine other vectors and transmit flags of the determination results to the distribution unit 40 to allow the distribution unit 40 to perform the process of three-phase-on.

Before distribution of the motor voltage vector, the three-phase-on determination unit may determine whether to perform three-phase-on in regard to the motor voltage vector V (vd and vq).

In FIG. 2, the motor control block 32 is arranged differently from the vehicle control unit 30 which is a higher-order control unit. However, the vehicle control unit 30 may execute the functions of the motor control block 32. Furthermore, the motor control block 32 may include a lower-order microcomputer. Moreover, all or part of the motor control block 32 may include hardware controlling circuit.

The motor control block 32 may include a plurality of CPUs. In this case, the functions are divided so that each CPU executes each function. In a case where the motor control block 32 includes the plurality of CPUs, each CPU may be configured to execute the entire processing.

In the embodiment, two power supplies and two inverters are used. However, a system may include three or more power supplies and three or more inverters, and a plurality of inverters may be controlled based on a total voltage.

Two inverters may be controlled by a system provided with two power supplies and two inverters based on a total voltage. Alternatively, two inverters may be controlled by two CPUs in a system provided with two power supplies and two inverters based on a total voltage. With such an arrangement, even when one CPU fails, it is possible to drive a motor by the other CPU.

The invention claimed is:

1. A motor system comprising:
a first inverter provided with a plurality of arms, each arm including a high-side switching element and a low-side switching element connected in series and having both ends to which direct current power from a first power supply is supplied and having an intermediate point from which alternating current power is output;
a second inverter provided with a plurality of arms, each arm including a high-side switching element and a low-side switching element connected in series and having both ends to which direct current power from a second power supply is supplied and having an intermediate point from which alternating current power is output
a motor which is driven by the alternating current power from the first inverter and the alternating current power from the second inverter, the motor having a plurality of phase coils, the first inverter is connected to one end of each of the phase coils of the motor and the second inverter is connected to the other end of each of the phase coils of the motor; and
a control unit which is configured to control the first inverter and the second inverter,
the control unit is configured to distribute a motor voltage vector corresponding to an output request for the motor to a first inverter voltage vector associated with an output from the first inverter and a second inverter voltage vector associated with an output from the second inverter and determines whether a switching condition for three-phase-on mode is satisfied, and when the control unit determines that the switching condition for three-phase-on mode is satisfied, the control unit switches to three-phase-on mode in which every high-side switching element or every low-side switching element of one of the first inverter and the second inverter is turned on and one end of a coil in each phase of the motor is brought into common connection to connect the motor into a star connection, and the control unit drives the motor with an output from the other of the first inverter and the second inverter, when the control unit determines that the switching condition for three-phase-on mode is not satisfied, the control unit drives the motor by passing a current from one of the first inverter and the second inverter to the other of the first inverter and the second inverter, wherein the switching condition for three-phase-on mode includes failure of one of the first inverter and the second inverter and when the first inverter voltage vector or the second inverter voltage vector being approximate to 0 when neither of the first inverter and the second inverter fails, and when the switching condition for three-phase-on mode for the first inverter voltage vector or the second inverter voltage vector being approximate to 0 when neither of the first inverter and the second inverter fails is satisfied, the motor voltage vector corresponding to the output request is distributed to the first inverter voltage vector and the second inverter voltage vector, the first inverter voltage vector or the second inverter voltage vector is set to 0 and the one of the first inverter and the second inverter is set to three-phase-on mode, and the other of the first inverter voltage vector or the second inverter voltage vector is set to a value corresponding to the motor voltage vector.

2. The motor system according to claim 1,
wherein, in a situation where one switching element of the one of the first inverter and the second inverter is short-circuited, when the short-circuited switching element is a high-side switching element, the control unit turns on every high-side switching element, or when the short-circuited switching element is a low-side switching element, the control unit turns on every low-side switching element.

3. The motor system according to claim 1,
wherein, in a situation where neither of the first inverter and the second inverter fails and an inverter voltage vector of an output from one of the first inverter and the second inverter is approximate to 0, when a change in the motor voltage vector is equal to a predetermined value or more, the control unit prohibits switching to three-phase-on mode.

4. The motor system according to claim 2,
wherein, in a situation where neither of the first inverter and the second inverter fails and an inverter voltage vector of an output from one of the first inverter and the second inverter is approximate to 0, when a change in the motor voltage vector is equal to a predetermined value or more, the control unit prohibits switching to three-phase-on mode.

5. The motor system according to claim 1, wherein the star connection is formed when every high-side switching element or every low-side switching element of one of the first inverter and the second inverter is turned on and when every high-side switching element or every low-side switching element of the one of the first inverter and the second inverter is turned off opposite of the every high-side switching element or every low-side switching element of the one of the first inverter and the second inverter that is turned on, the one end of the coil in each phase of the motor is brought into common connection.

\* \* \* \* \*